United States Patent
Catellani

(10) Patent No.: US 6,863,147 B2
(45) Date of Patent: Mar. 8, 2005

(54) HYDROSTATIC POWER STEERING DEVICE FOR FAST STEERING

(75) Inventor: Tommaso Catellani, Borzano di Albinea (IT)

(73) Assignee: Ognibene S.p.A., Reggio Emila (IT)

(*) Notice: Subject to any disclaimer, the term of this patent is extended or adjusted under 35 U.S.C. 154(b) by 0 days.

(21) Appl. No.: 10/443,823

(22) Filed: May 23, 2003

(65) Prior Publication Data

US 2003/0217550 A1 Nov. 27, 2003

(30) Foreign Application Priority Data

May 27, 2002 (IT) ..................................... RE2002A0049

(51) Int. Cl.[7] ................................................ B62D 5/06
(52) U.S. Cl. ........................................ 180/417; 60/384
(58) Field of Search ............................ 180/434, 439.4, 180/41–442; 280/89–90, 77; 60/91–92, 384–388

(56) References Cited

U.S. PATENT DOCUMENTS

| | | | | |
|---|---|---|---|---|
| RE25,126 E | * | 2/1962 | Charlson | 91/467 |
| 3,801,239 A | * | 4/1974 | Larson | 418/61.3 |
| 3,819,307 A | * | 6/1974 | Uppal | 418/61.3 |
| 3,960,234 A | * | 6/1976 | Morgan | 180/441 |
| 4,033,377 A | * | 7/1977 | Johnson | 137/596 |
| 4,050,474 A | * | 9/1977 | Morgan | 137/596 |
| 4,109,679 A | * | 8/1978 | Johnson | 137/596.13 |
| 5,165,496 A | * | 11/1992 | Pedersen et al. | 180/403 |
| 5,785,144 A | * | 7/1998 | Cakmaz et al. | 180/422 |
| 6,065,561 A | * | 5/2000 | Howard | 180/441 |
| 6,513,620 B2 | * | 2/2003 | Igawa et al. | 180/422 |

FOREIGN PATENT DOCUMENTS

| | | | | |
|---|---|---|---|---|
| DE | 19935021 A1 | | 2/2000 | |
| EP | 1366969 | * | 3/2003 | ........... B62D/5/093 |
| GB | 1355955 | * | 6/1974 | ........... B62D/5/08 |
| GB | 1524707 | * | 9/1978 | ........... B62D/5/08 |
| GB | 2341159 A | * | 3/2000 | ........... B62D/5/06 |

* cited by examiner

Primary Examiner—Lesley D. Morris
Assistant Examiner—Paul Royal, Jr.
(74) Attorney, Agent, or Firm—Browdy and Neimark, P.L.L.C.

(57) ABSTRACT

Hydrostatic power steering device comprising a source of pressurized fluid, a cylindrical barrel-type distributor the elements of which are connected elastically together, and of which the inner element, the so called spindle, is connected to the steering wheel; the distributor being arranged to assume a central position, the so-called neutral position, in which it directly short-circuits, to discharge, the fluid originating from the source of pressurized fluid, and two positions, symmetrical about the central position, in which the distributor, via a dispenser of orbital type the rotor of which is rigidly connected to the steering wheel shaft and to the spindle, feeds the fluid to one and respectively to the other of the chambers of a hydraulic actuator connected to the steering wheel; the device also comprises an auxiliary conduit for feeding the pressurized fluid to the cylindrical distributor; a slide valve operable by the driver to feed said auxiliary feed conduit when desired; a barrel locking system operated by the pressure of the fluid present in said auxiliary feed conduit; and holes and grooves in the barrel and in the spindle to directly connect said auxiliary feed conduit to one or other chamber of the actuator without passing through the dispenser rotor.

9 Claims, 4 Drawing Sheets

HYDROSTATIC POWER STEERING DEVICE FOR FAST STEERING

BACKGROUND OF THE INVENTION

1. Technical Field of the Invention

This invention relates to hydrostatic power steering systems for road and industrial vehicles.

2. Prior Art

Said systems comprise a hydraulic actuator arranged to operate in two opposing directions, generally in the form of a cylinder-piston unit with a through rod, which is connected to the steering frame. The hydraulic actuator is fed via a cylindrical distributor which directs controlled quantities of pressurized hydraulic fluid supplied by a pump to the actuator, and directs the fluid leaving the actuator to discharge.

The quantity of fluid fed to the actuator is controlled by a dispenser of orbital type, the rotor of which is connected to the steering wheel. The distributor assumes three operative positions, in one of which, the so-called neutral position, the pressurized fluid originating from the pump is fed directly to discharge, whereas in each of the other two the pressurized fluid is fed to the hydraulic actuator which controls the steering in one or the opposite direction, the fluid leaving the hydraulic actuator being fed to discharge.

The distributor is generally of the cylindrical barrel type, comprising two sealedly coupled cylindrical bodies able to assume different relative angular positions.

The inner body (the spindle) is axially hollow and is coupled to the vehicle steering wheel.

The outer body, commonly known as the barrel, is torsionally connected to the spindle by elastic means, limited to initial small rotations, and by rigid means beyond small rotations.

Both the bodies are provided with holes and axial grooves distributed on their surface, which assume mutual correspondence on the basis of the relative angular position between the spindle and barrel.

The elastic means maintain the barrel and spindle in that relative position corresponding to neutral, whereas operating the steering wheel modifies the relative mutual position between the barrel and spindle to direct the hydraulic fluid along one or other direction corresponding to the two different steering directions.

The connection between the steering wheel shaft and the spindle is rigid, whereas that between the spindle and barrel is elastic with the result that operating the steering wheel causes a phase displacement between the spindle and barrel which is maintained constant while the steering wheel is rotating, whereas when steering wheel rotation ceases the elastic means return the barrel and spindle into phase.

The hydraulic fluid fed to the hydraulic actuator is measured by an orbital dispenser, the rotations of which correspond to the rotations of the spindle and hence to the rotations of the steering wheel. In this manner, while the steering wheel is rotated in one or other direction, the fluid continues to be fed in controlled quantities to the hydraulic actuator which operates the steering, and the wheels continue to change direction.

When however the steering wheel is maintained stationary, controlled feed to the hydraulic actuator ceases and the wheels maintain their steered position.

Known devices of the aforesaid type present a drawback consisting of the fact that the steering wheel has to continue to be rotated in order to continue to steer the vehicle wheels; in this respect, if rotation of the steering wheel is halted, the barrel and spindle return in phase, and the wheels remain locked in that steering angle which they have attained.

This method of operation is extremely uncomfortable during those vehicle operations involving very tight steering movements to be made one following the other in one and the other direction.

To effect said movements the driver is obliged to continue to rotate the steering wheel for several turns in one direction and then to immediately rotate it in the opposite direction for the same number of turns.

A requirement therefore exists for a hydrostatic power steering device which, besides providing for the normal operation of the state of the art, also enables complete steering movements to be effected by modest rotations of the steering wheel.

OBJECT OF THE INVENTION

An object of this invention is therefore to provide a hydrostatic power steering device which, in addition to the normal mode of operation, also offers a further mode which enables complete wheel steering by a limited rotation of the steering wheel.

A further object of the invention is to provide a hydrostatic power steering device which enables said steering to be effected in a much shorter time that that involved in the normal method of operation.

A further object of the invention is to provide a hydrostatic power steering device which enables the two said objects to be attained both in so-called closed-centre hydrostatic power steering devices and in open-centre devices, able to operate either in reactive or non-reactive operating mode.

The invention is described hereinafter relative to an open-centre hydrostatic power steering device, however that stated is also applicable to a closed-centre hydrostatic power steering device by just the few modifications well known to the expert of the art.

DESCRIPTION OF THE DRAWINGS

The constructional and operational merits and characteristics of the invention will be apparent from the ensuing detailed description, given by way of non-limiting example and illustrated by the figures of the accompanying drawings.

DETAILED DESCRIPTION OF THE PREFERRED EMBODIMENTS OF THE INVENTION

Figure 1:
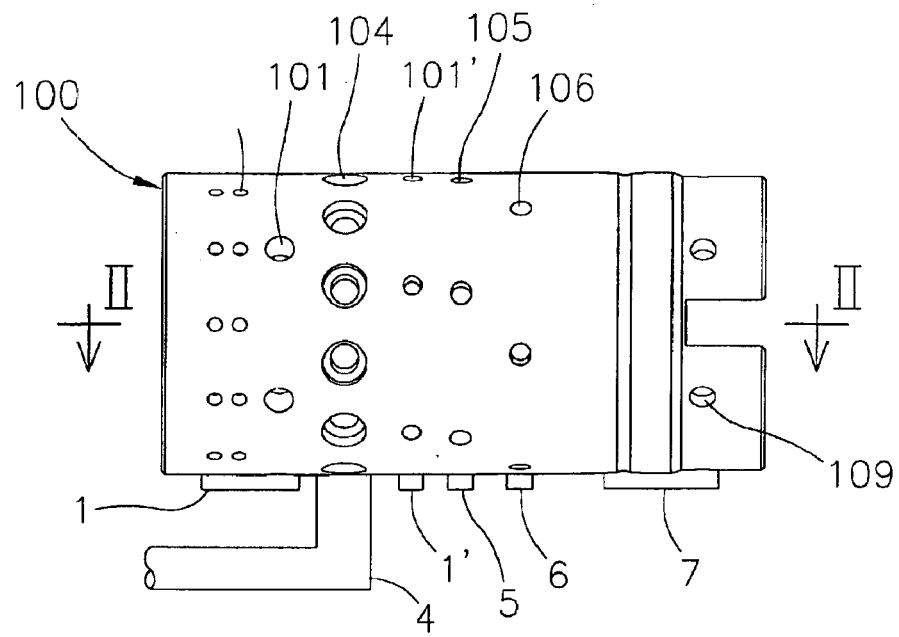
FIG. 1 is a side view of the barrel of a rotary distributor according to the invention.
Figure 2:
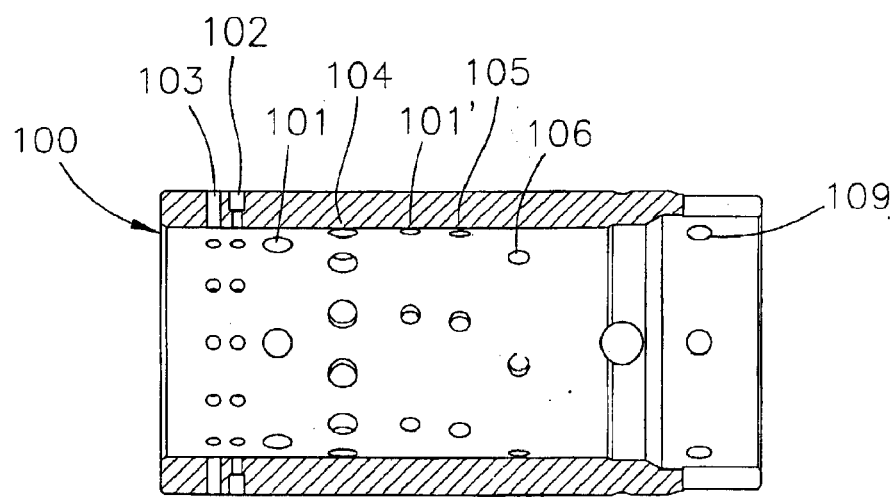
FIG. 2 shows the section II—II of FIG. 1.
Figure 3:
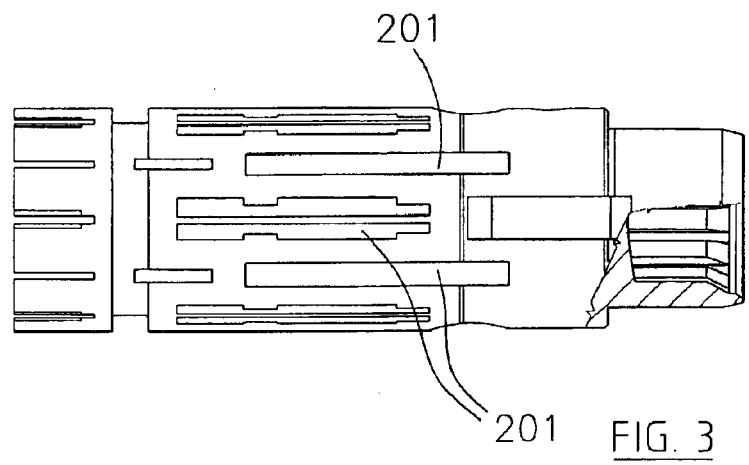
FIG. 3 is a side view of the rotary distributor hollow spindle which is to be inserted into the barrel of FIG. 1, the milled grooves for passage of the hydraulic fluid being shown schematically.
Figure 5:
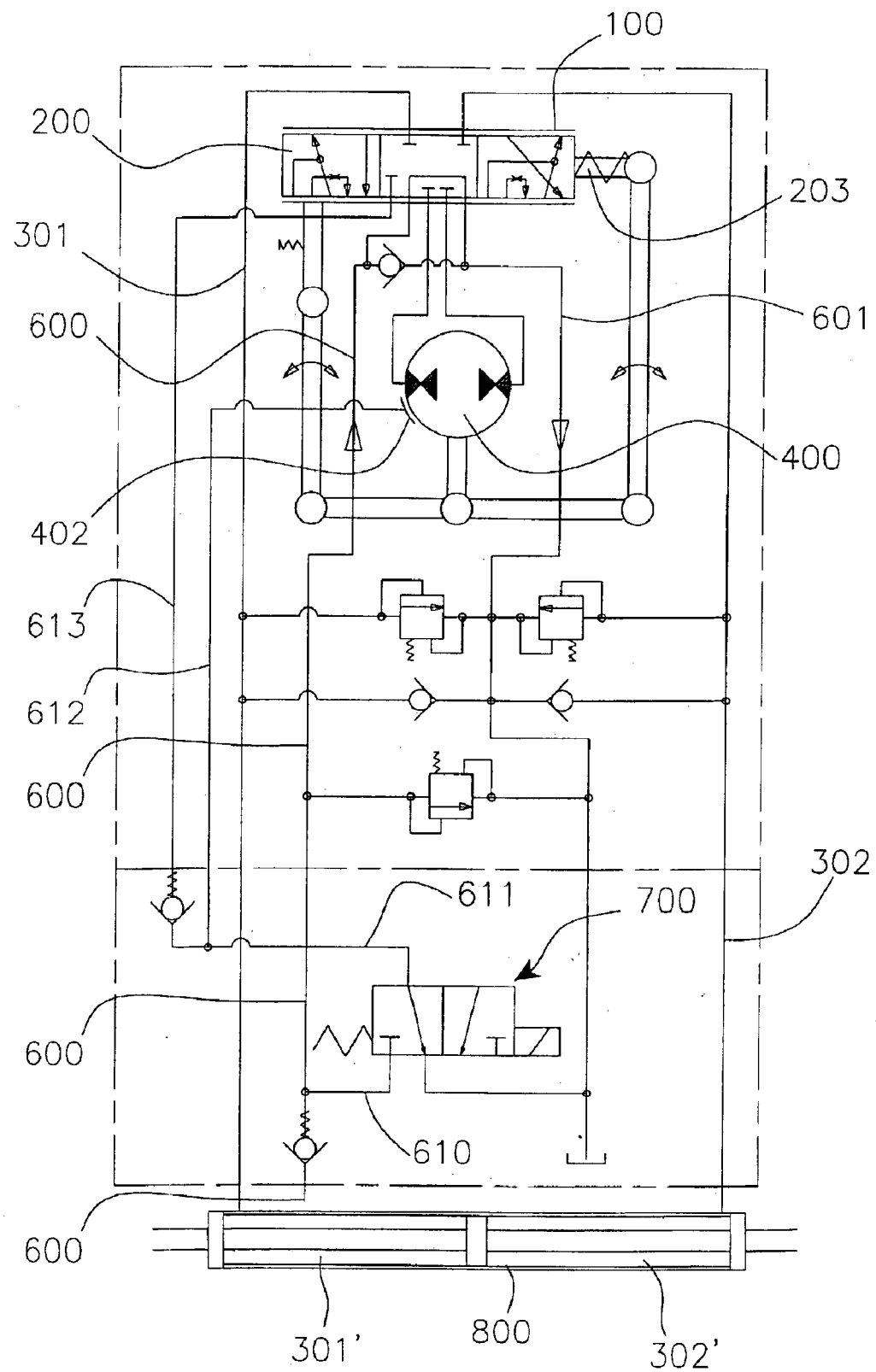
FIG. 5 shows the hydraulic scheme of the invention.

With reference to the figures, the invention comprises an outer barrel 100 provided with the following circumferential alignments of through holes, equidistant in each alignment:

a first alignment of six first holes 101 opening into a circumferential groove 1 of the outer casing, shown schematically in FIG. 1, in communication with a first feed of pressurized hydraulic fluid;

a second alignment of twelve second holes 104, of differential cross-section and with their narrow end facing the spindle, they lying in front of a series of seven equidistant holes 4 in the casing, which are shown schematically in FIG. 1 and communicate with the lobes of the orbital dispenser;

a third alignment of six third holes 105 which open into a circumferential groove 5 of the outer casing, shown schematically in FIG. 1, communicating with that 301' of the two chambers 301', 302' of the hydraulic actuator 800 which controls the right hand steering (FIG. 5);

a fourth alignment of six fourth holes 106 which open into a circumferential groove 6 of the outer casing, shown schematically in FIG. 1, communicating with that 302' of the two chambers 301', 302' of the hydraulic actuator 800 which controls the left hand steering (FIG. 5);

a fifth alignment of six fifth holes 101' opening into a circumferential groove 1' of the outer casing, shown schematically in FIG. 1, communicating with a second feed of pressurized hydraulic fluid.

Figure 4:
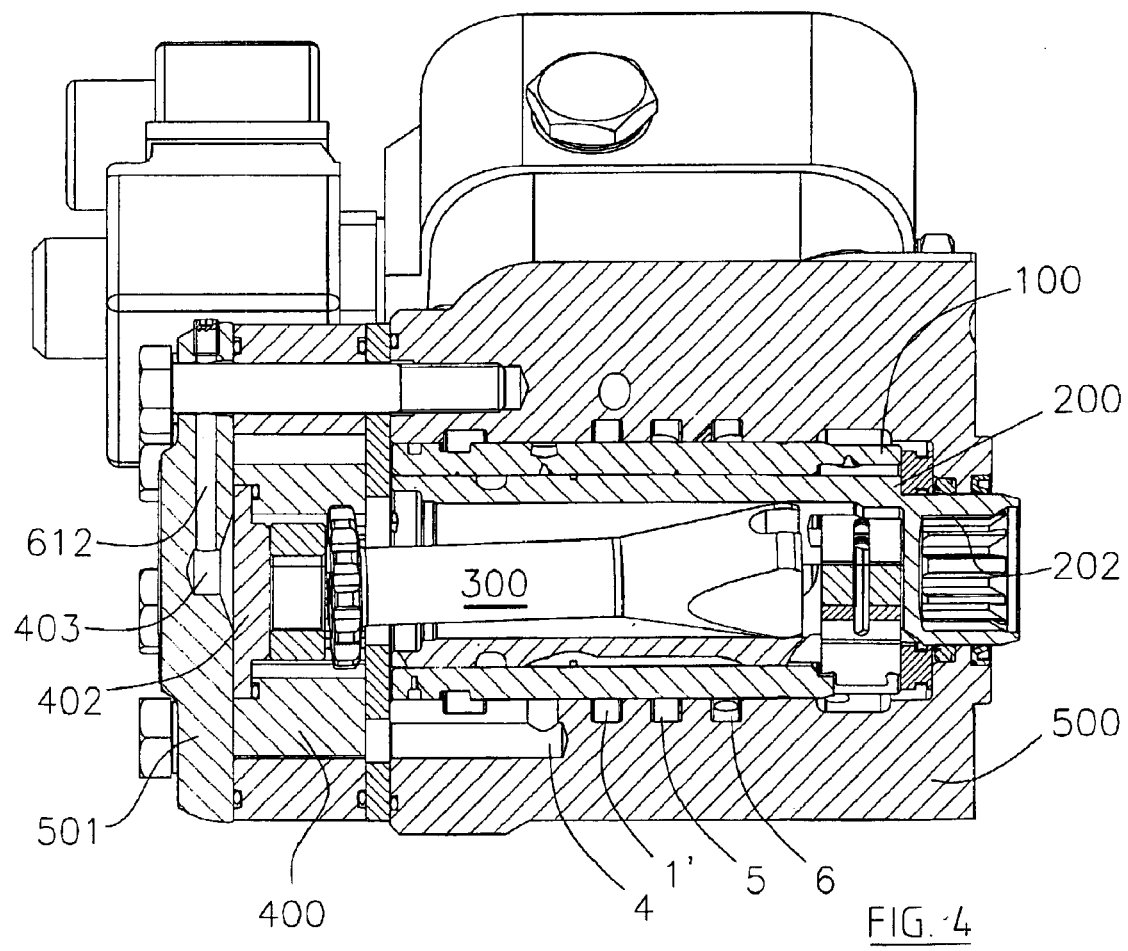
FIG. 4 shows a section through the invention.

Inside the barrel 100 there is positioned a hollow spindle 200 comprising various series of longitudinal milled grooves 201 of such length and distribution as to reproduce the hydraulic scheme and operation of the device in accordance with the scheme of FIG. 5. FIG. 4 shows an overall section through the device in which can be seen the barrel 100, the spindle 200 comprising, to the right in the figure, a splined connector 202 for the steering wheel shaft (not shown), and an oscillating rod 300 which connects the steering wheel shaft to the orbital rotor 400.

Between the spindle 200 and the barrel 100 there is positioned the usual elastic drag system.

The entire assembly is enclosed within a casing 500 in which the grooves 5, 6, 1' and 4 can be seen, connected to the series of holes of the barrel 100 in the described manner.

Between the orbital rotor 400 and the cover 501 of the casing 500 there is plate 402 which on one side rests on the rotor and on the opposite side faces a cavity 403 containing hydraulic fluid and connected by the conduit 612 to the system circuit as shown in the hydraulic scheme of FIG. 5.

In FIG. 5 the hydraulic scheme shows the device in the neutral position, i.e. with the steering system actuator 800 stationary. The conduit 600 is connected to the source of pressurized hydraulic fluid, a conduit 610 branching therefrom to feed a slide valve 700 which under normal conditions is in the position shown in FIG. 5 to maintain the conduit 610 closed.

The valve 700 is positioned in proximity to the steering wheel of the vehicle on which the power steering device is mounted, so that it is handy for the driver such that he can operate it without removing his hands from the steering wheel.

The conduit 600 enters the body of the power steering device via the casing 500, and communicates with the discharge conduit 601 via the channels in the barrel 100 and spindle 200. The branch conduit 610 feeds, via the valve 700, a conduit 611 which itself branches into two conduits 612 and 613.

The conduit 612 leads to the chamber 403 (FIG. 4) of the power steering device, while the conduit 613 leads to the distributor 100, 200 and in the illustrated configuration is closed.

The method of operation of the of the invention will now be described with reference to FIG. 5.

To operate the power steering device in normal mode, the driver merely rotates the steering wheel clockwise or anticlockwise to turn right or left.

While he continues to rotate the steering wheel for example anticlockwise, the barrel and spindle remain displaced in phase to maintain the distribution active.

In this situation the pressurized hydraulic fluid originating from the conduit 600 feeds the rotor 400, which by rotating dispenses it to the conduit 301/302 which feds the actuator 800 to steer the right/left wheels.

If the driver wishes to continue steering the wheels while maintaining the steering wheel stationary, he operates the valve 700 so that it assumes the position, not shown, in which pressurized fluid is also fed to the conduit 611.

This fluid passes through the conduit 612 to pressurize the chamber 403 where it urges the disc 402 against the rotor 400, to lock it.

Under these conditions, the barrel 100 is braked via the rotor 400, the rod 300 and a connection pin, not shown, the command acting on the spindle 200 maintaining the actuator fed only by the conduit 613, without being determined by the rotor, which remains stationary. As the undetermined throughput of the conduit 613 exceeds that passing through the rotor, the wheel steering speed increases. To return to normal operating mode, the valve 700 closing the conduit 611 has merely to be released, by which the conduits 612 and 613 are closed, the rotor is released and fluid is fed to the actuator only via the rotor.

Figure 6:
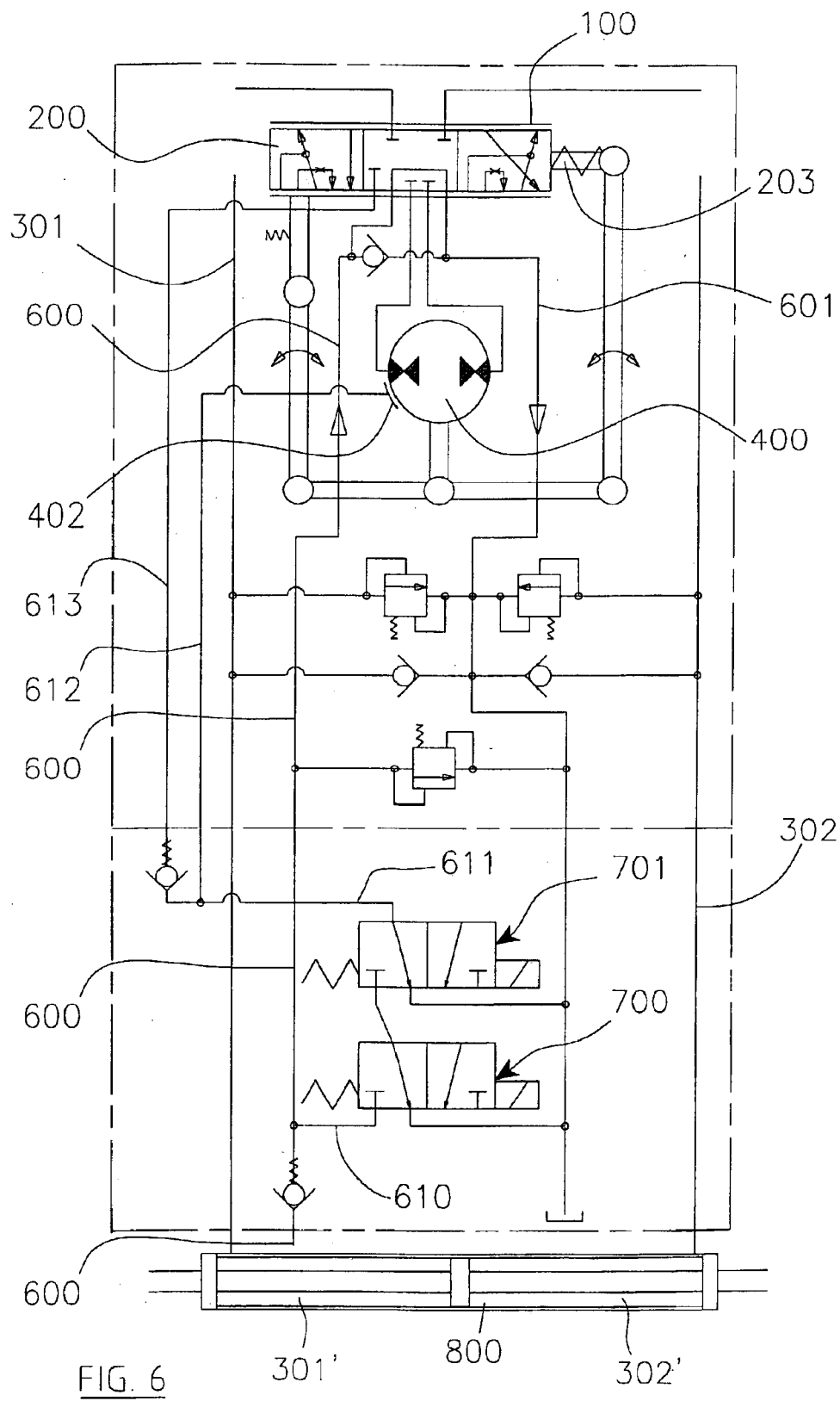
FIG. 6 shows the hydraulic scheme of a variant of the invention.

FIG. 6 shows a variant of the invention which differs from the already described embodiment by the presence of a second valve 701 identical to the valve 700 and connected in series with it. The two valves 700 and 701 are operated by the same control, not shown, positioned in proximity to the steering wheel of the vehicle on which the power steering device is mounted, so that the driver can operate it without removing his hands from the steering wheel. The presence of two valves reduces the risk of undesired steering movements should one of the two valves 700 and 701 accidentally remain open. In such a case the other valve is in fact set in the discharge position.

What is claimed is:

1. A hydrostatic power steering device comprising a source of pressurized fluid, a cylindrical distributor (100, 200) an outer barrel and an inner spindle of which are connected elastically together, the spindle (200), is connected to the steering wheel; the distributor being arranged to assume a central position, the so-called neutral position, in which it directly short-circuits, to discharge, the fluid originating from the source of pressurized fluid, and two positions, symmetrical about the central position, in which the distributor, via a dispenser (400) the rotor of which is rigidly connected to the steering wheel shaft and to the spindle, feeds the fluid to one and respectively to the other of chambers (301', 302') of a hydraulic actuator (800) connected to the steering wheel, characterised by comprising an auxiliary feed conduit (613) for feeding the pressurized fluid to the cylindrical distributor;

at least one slide valve (700) operable by the driver to feed said auxiliary feed conduit when desired;

a barrel locking system (402) operated by the pressure of the fluid present in said auxiliary feed conduit;

holes and grooves in the outer barrel and in the spindle to directly connect said auxiliary feed conduit to one or other of the chambers (301', 302') of the actuator without passing through the dispenser rotor.

2. A device as claimed in claim 1, characterised in that the outer barrel (100) of the distributor is provided with:
- a first alignment of holes (101) opening into a circumferential groove (1) of the outer casing, in communication with the feed of pressurized hydraulic fluid;
- a second alignment of holes (104) lying in front of a series of seven equidistant holes (4) in the casing which communicate with the lobes of the orbital dispenser device;
- a third alignment of holes (105) opening into a circumferential groove (5) of the outer casing, in communication with the first of the two chambers of the hydraulic actuator connected to the steering gear;
- a fourth alignment of holes (106) which open into a circumferential groove (6) of the outer casing communicating with the second of the two chambers of the of the hydraulic actuator connected to the steering gear;
- a fifth alignment of holes (101') opening into a circumferential groove (1') of the outer casing communicating with the auxiliary pressurized fluid feed conduit; and
- an inner hollow spindle (200) comprising at least one series of milled grooves arranged to connect the groove (1') of the device body to the grooves (5 or 6) thereof according to the direction of operation of the steering wheel.

3. A device as claimed in claim 2, characterised in that when the cylindrical barrel distributor is in its neutral position, the barrel holes (105, 106) communicate via spindle grooves with the barrel holes (104) and via these latter with the actuator.

4. A device as claimed in claim 3, characterised in that the holes (101) of the first alignment are offset from the holes (104) of the second alignment, whereas the holes (104) are aligned alternately with the holes (105) of the third alignment and with the holes (106) of the third alignment respectively.

5. A device as claimed in claim 1, characterised by comprising two valves (700, 701) connected in series and operable by the driver by means of a single control.

6. A hydrostatic power steering device comprising a source of pressurized fluid, a cylindrical distributor (100, 200) an outer barrel and an inner spindle of which are connected elastically together, the spindle (200), is connected to the steering wheel; the distributor being arranged to assume a central position, the so-called neutral position, in which it directly short-circuits, to discharge, the fluid originating from the source of pressurized fluid, and two positions, symmetrical about the central position, in which the distributor, via a dispenser (400) the rotor of which is rigidly connected to the steering wheel shaft and to the spindle, feeds the fluid to one and respectively to the other of chambers (301', 302') of a hydraulic actuator (800) connected to the steering wheel, characterised by comprising
- an auxiliary feed conduit (613) for feeding the pressurized fluid to the cylindrical distributor;
- at least one slide valve (700) operable by the driver to feed said auxiliary feed conduit when desired;
- a barrel locking system (402) operated by the pressure of the fluid present in said auxiliary feed conduit;
- holes and grooves in the outer barrel and in the spindle to directly connect said auxiliary feed conduit to one or other of the chambers (301', 302') of the actuator without passing through the dispenser rotor, wherein the outer barrel (100) is provided with:
- a first alignment of holes (101) opening into a circumferential groove (1) of the outer casing, in communication with the feed of pressurized hydraulic fluid;
- a second alignment of holes (104) lying in front of a series of seven equidistant holes (4) in the casing which communicate with the lobes of the orbital dispenser device;
- a third alignment of holes (105) opening into a circumferential groove (5) of the outer casing, in communication with the first of the two chambers of the hydraulic actuator connected to the steering gear;
- a fourth alignment of holes (106) which open into a circumferential groove (6) of the outer casing communicating with the second of the two chambers of the of the hydraulic actuator connected to the steering gear;
- a fifth alignment of holes (101') opening into a circumferential groove (1') of the outer casing communicating with the auxiliary pressurized fluid feed conduit; and
- an inner hollow spindle (200) comprising at least one series of milled grooves arranged to connect the groove (1') of the device body to the grooves (5 or 6) thereof according to the direction of operation of the steering wheel.

7. A device as claimed in claim 6, characterised in that when the cylindrical barrel distributor is in its neutral position, the barrel holes (105, 106) communicate via spindle grooves with the barrel holes (104) and via these latter with the actuator.

8. A device as claimed in claim 7, characterised in that the holes (101) of the first alignment are offset from the holes (104) of the second alignment, whereas the holes (104) are aligned alternately with the holes (105) of the third alignment and with the holes (106) of the third alignment respectively.

9. A device as claimed in claim 6, characterised by comprising two valves (700, 701) connected in series and operable by the driver by means of a single control.

* * * * *